United States Patent
Hayes et al.

(10) Patent No.: US 9,816,603 B2
(45) Date of Patent: Nov. 14, 2017

(54) AXLE ASSEMBLY WITH INTERAXLE DIFFERENTIAL LUBRICATION

(71) Applicant: ArvinMeritor Technology, LLC, Troy, MI (US)

(72) Inventors: Brian D. Hayes, Newark, OH (US); Robert J. Martin, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 204 days.

(21) Appl. No.: 14/851,004

(22) Filed: Sep. 11, 2015

(65) Prior Publication Data

US 2017/0074390 A1    Mar. 16, 2017

(51) Int. Cl.
| | | |
|---|---|---|
| F16H 57/04 | (2010.01) |
| F16C 33/66 | (2006.01) |
| F16H 48/08 | (2006.01) |
| F16C 19/54 | (2006.01) |

(52) U.S. Cl.
CPC ..... *F16H 57/0483* (2013.01); *F16C 33/6659* (2013.01); *F16H 48/08* (2013.01); *F16H 57/0421* (2013.01); *F16H 57/0424* (2013.01); *F16H 57/0457* (2013.01); *F16H 57/0471* (2013.01); *F16C 19/548* (2013.01)

(58) Field of Classification Search
None
See application file for complete search history.

(56) References Cited

U.S. PATENT DOCUMENTS

| 2,368,963 | A | * | 2/1945 | Boden | F16C 19/548 |
| | | | | | 114/20.1 |
| 2,908,351 | A | * | 10/1959 | Daley, Jr. | F16H 57/0434 |
| | | | | | 184/6.12 |
| 4,612,818 | A | * | 9/1986 | Hori | F16H 57/0457 |
| | | | | | 184/6.12 |
| 5,161,644 | A | * | 11/1992 | Swenskowski | F16H 57/0447 |
| | | | | | 180/339 |
| 5,404,963 | A | | 4/1995 | Crepas et al. | |
| 2005/0272551 | A1 | * | 12/2005 | Oates | B60K 17/165 |
| | | | | | 475/160 |
| 2009/0208152 | A1 | * | 8/2009 | Masuda | F16C 19/364 |
| | | | | | 384/100 |
| 2010/0304914 | A1 | * | 12/2010 | Barrett | F16H 48/08 |
| | | | | | 475/160 |
| 2014/0243137 | A1 | | 8/2014 | Kwasniewski et al. | |

FOREIGN PATENT DOCUMENTS

| DE | 3506089 A1 | 8/1985 |
| DE | 9410105 U1 | 9/1994 |
| JP | H101038777 A | 5/1998 |
| JP | H10306868 A | 11/1998 |

OTHER PUBLICATIONS

European Patent Office, Extended European Search Report for the corresponding European Patent Application No. 16182693.8 dated Apr. 4, 2017.

* cited by examiner

*Primary Examiner* — Justin Holmes
(74) *Attorney, Agent, or Firm* — Brooks Kushman P.C.

(57) ABSTRACT

An axle assembly having a housing assembly that may have at least one lubricant passage. The lubricant passage may provide lubricant to an interaxle differential unit via a roller bearing assembly and at least one flange lubricant hole that may be provided in a flange portion of an input shaft.

20 Claims, 8 Drawing Sheets

AXLE ASSEMBLY WITH INTERAXLE DIFFERENTIAL LUBRICATION

TECHNICAL FIELD

This patent application relates to an axle assembly having a lubricant passage that may provide lubricant to an interaxle differential unit.

BACKGROUND

An axle assembly and method of differential lubrication control is disclosed in U.S. Patent Application No. 2014/0243137.

SUMMARY

In at least one embodiment, an axle assembly is provided. The axle assembly may include a housing assembly, an input shaft, a first roller bearing assembly, an output shaft, and an interaxle differential unit. The housing assembly may have an interior surface and a first lubricant passage. The input shaft may rotate about an axis and may include a first end and a flange portion disposed opposite the first end. The flange portion may have a flange lubricant hole. The first roller bearing assembly may be disposed proximate the housing assembly and may rotatably support the input shaft. The output shaft may be disposed in the housing assembly and may be configured to provide torque to a second axle assembly. The interaxle differential unit may be operatively coupled to the input shaft and the output shaft and may compensate for rotational speed differences between the input shaft and the output shaft. The first lubricant passage may be disposed between the interior surface and the interaxle differential unit. The first lubricant passage may have a first lubricant passage outlet that may be disposed between the end of the input shaft and the first roller bearing assembly. Lubricant that exits the first lubricant passage outlet may flow through the first roller bearing assembly and then may pass through the flange lubricant hole to lubricate the interaxle differential unit.

In at least one embodiment an axle assembly is provided. The axle assembly may include a housing assembly, an input shaft, an output shaft, a pinion, an interaxle differential unit, a first roller bearing assembly, and a second roller bearing assembly. The housing assembly may have an interior surface, a first lubricant passage, a second lubricant passage, and an inlet that may provide lubricant to the first and second lubricant passages. The input shaft may rotate about an axis and may have a flange portion that may have a flange lubricant hole. The output shaft may rotate about the axis and may be configured to provide torque to a second axle assembly. The pinion may rotate about the axis and may have a pinion hole that may receive the output shaft. The interaxle differential unit may be operatively coupled to the input shaft, the output shaft, and the pinion. The interaxle differential unit may compensate for rotational speed differences between the input shaft and the output shaft. The first roller bearing assembly may rotatably support the input shaft. The second roller bearing assembly may rotatably support the pinion. The first lubricant passage may be disposed between the interior surface and the second lubricant passage and may have a first lubricant passage outlet that may be disposed proximate the first roller bearing assembly. Lubricant that exits the first lubricant passage outlet may flow through first roller bearing assembly and then pass through the flange lubricant hole to lubricate the interaxle differential unit. The second lubricant passage may be disposed between the first lubricant passage and the pinion and may provide lubricant to the second roller bearing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
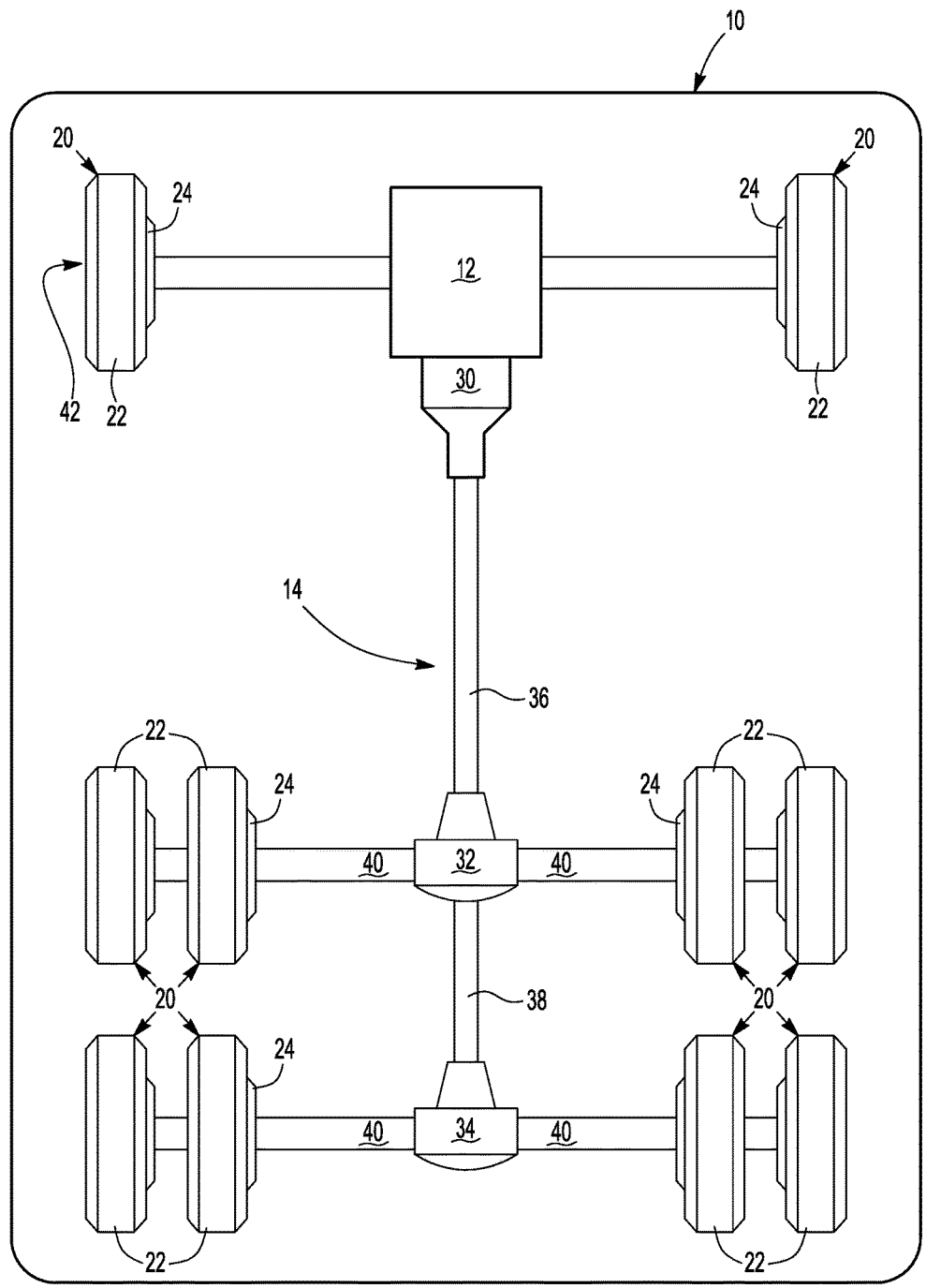
FIG. 1 is a schematic of an exemplary vehicle having an axle assembly.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include one or more power sources 12 and a drivetrain 14.

The power source 12 may provide power that may be used to rotate one or more traction wheels. In FIG. 1, a single power source 12 is shown that may be configured as an internal combustion engine that may be adapted to use or combust any suitable type of fuel, such as gasoline, diesel fuel, or hydrogen. Alternatively, multiple or different power sources may be provided, such as may be employed with a hybrid vehicle or electric vehicle. In such embodiments, a power source could be an electric power source, such as a battery, capacitor, or fuel cell, or a non-electric power source, such as a hydraulic power source.

The drivetrain 14 may be driven or powered by one or more power sources 12 and may provide torque to one or more fraction wheel assemblies 20 that may include a tire 22 mounted on a wheel 24. The drivetrain 14 may include a transmission 30 and one or more axle assemblies. In the embodiment shown, a tandem axle configuration is shown that includes a first axle assembly 32 and a second axle assembly 34. The first axle assembly 32 may be referred to as a forward-rear axle assembly. The second axle assembly 34 may be referred to as a rear-rear axle assembly. Optionally, additional axle assemblies may be provided that may be coupled together in series.

Torque may be transmitted through the drivetrain 14 in the following manner. The power source 12 may be operatively coupled to the input of the transmission 30. An output of the transmission 30 may be coupled to an input of the first axle assembly 32, such as with a drive shaft 36. An output of the first axle assembly 32 may be selectively coupled to an input of the second axle assembly 34 via a prop shaft 38.

The first and second axle assemblies 32, 34 may each have a plurality of outputs that may be coupled to one or more wheel assemblies 20. In the embodiment shown, the first and second axle assemblies 32, 34 each have a pair of outputs. Each output may be selectively or non-selectively coupled to a corresponding wheel axle 40 or half-shaft upon which one or more wheel assemblies 20 may be disposed.

The vehicle 10 may also include a front axle assembly 42 that may be configured to steer the vehicle 10. The front axle assembly 42 may or may not be configured as a drive axle that may provide torque to at least one associated wheel assembly 20.

Figure 2:
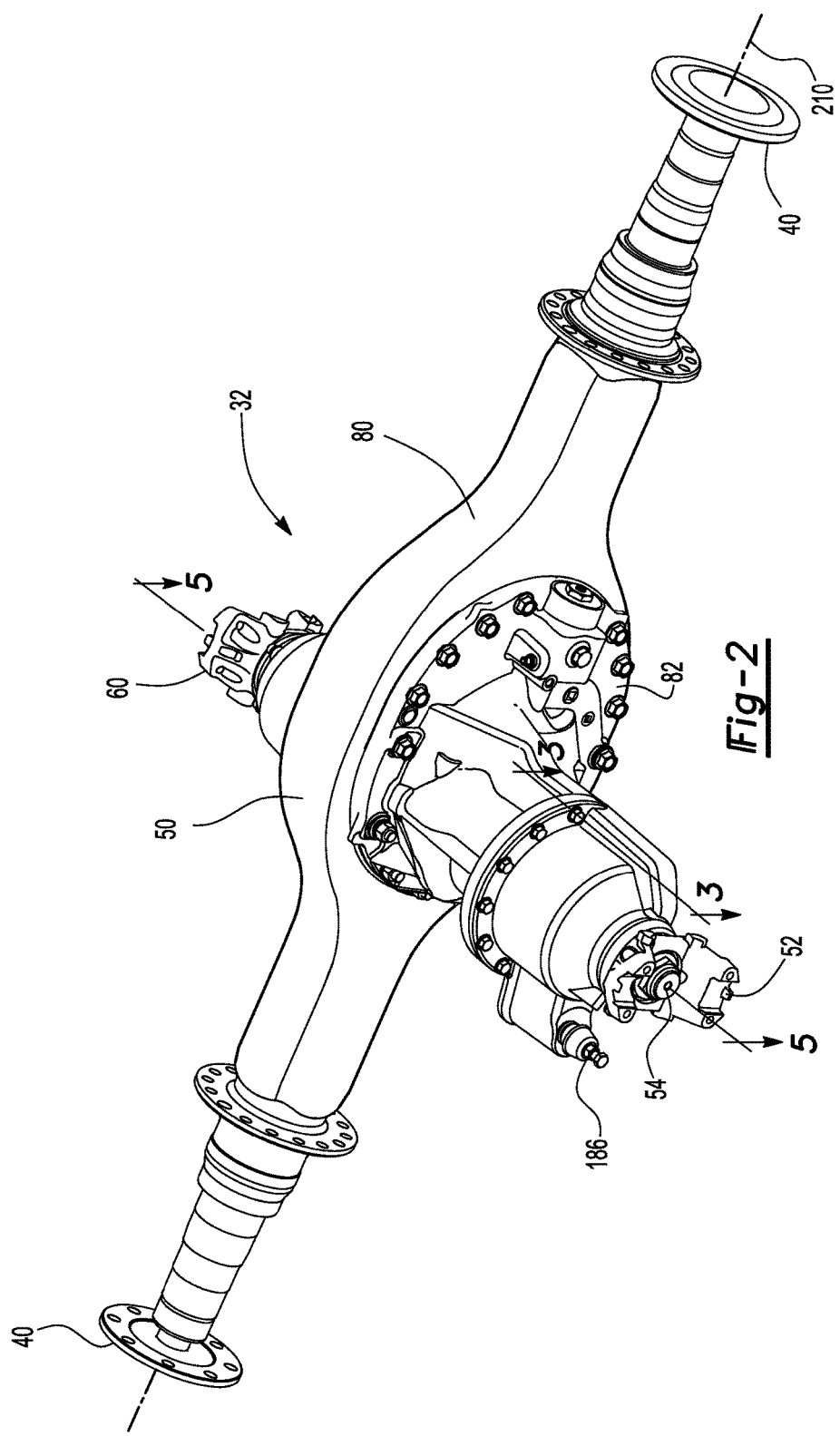
FIG. 2 is a perspective view of an axle assembly.
Figure 5:
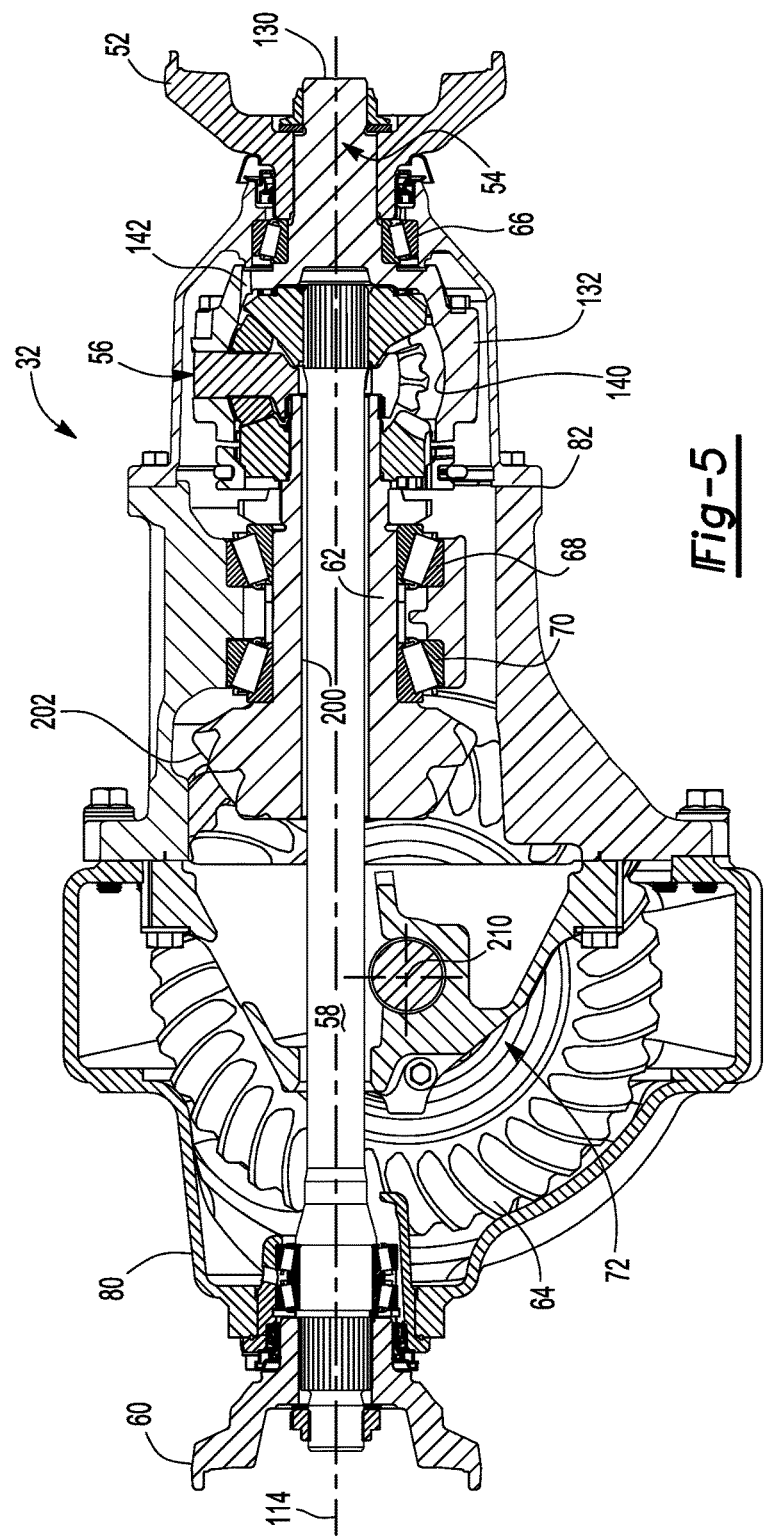
FIG. 5 is a section view of the axle assembly along section line 5-5.

Referring to FIGS. 2 and 5, the first axle assembly 32 is shown in more detail. The first axle assembly 32 may be configured to provide torque to its associated wheel assemblies 20 via the wheel axles 40 and to provide torque to the second axle assembly 34. The first axle assembly 32 may include a housing assembly 50, an input yoke 52, an input shaft 54, an interaxle differential unit 56, an output shaft 58, an output yoke 60, a pinion 62, a ring gear 64, a first roller bearing assembly 66, a second roller bearing assembly 68, a third roller bearing assembly 70, and a differential 72.

Referring to FIG. 2, the housing assembly 50 may receive various components of the first axle assembly 32. In addition, the housing assembly 50 may facilitate mounting of the first axle assembly 32 to the vehicle 10. In at least one embodiment, the housing assembly 50 may include an axle housing 80 and a differential carrier 82.

The axle housing 80 may extend between the wheel assemblies 20 and may support the wheel assemblies 20. The axle housing 80 may include a center portion and a pair of arm portions. The center portion may be disposed proximate the center of the axle housing 80. The center portion may define an opening that may face toward the differential carrier 82 and may have a cavity that may receive at least a portion of the differential 72. The arm portions may extend in opposite directions from the center portion and may each receive a wheel axle 40.

Figure 3:
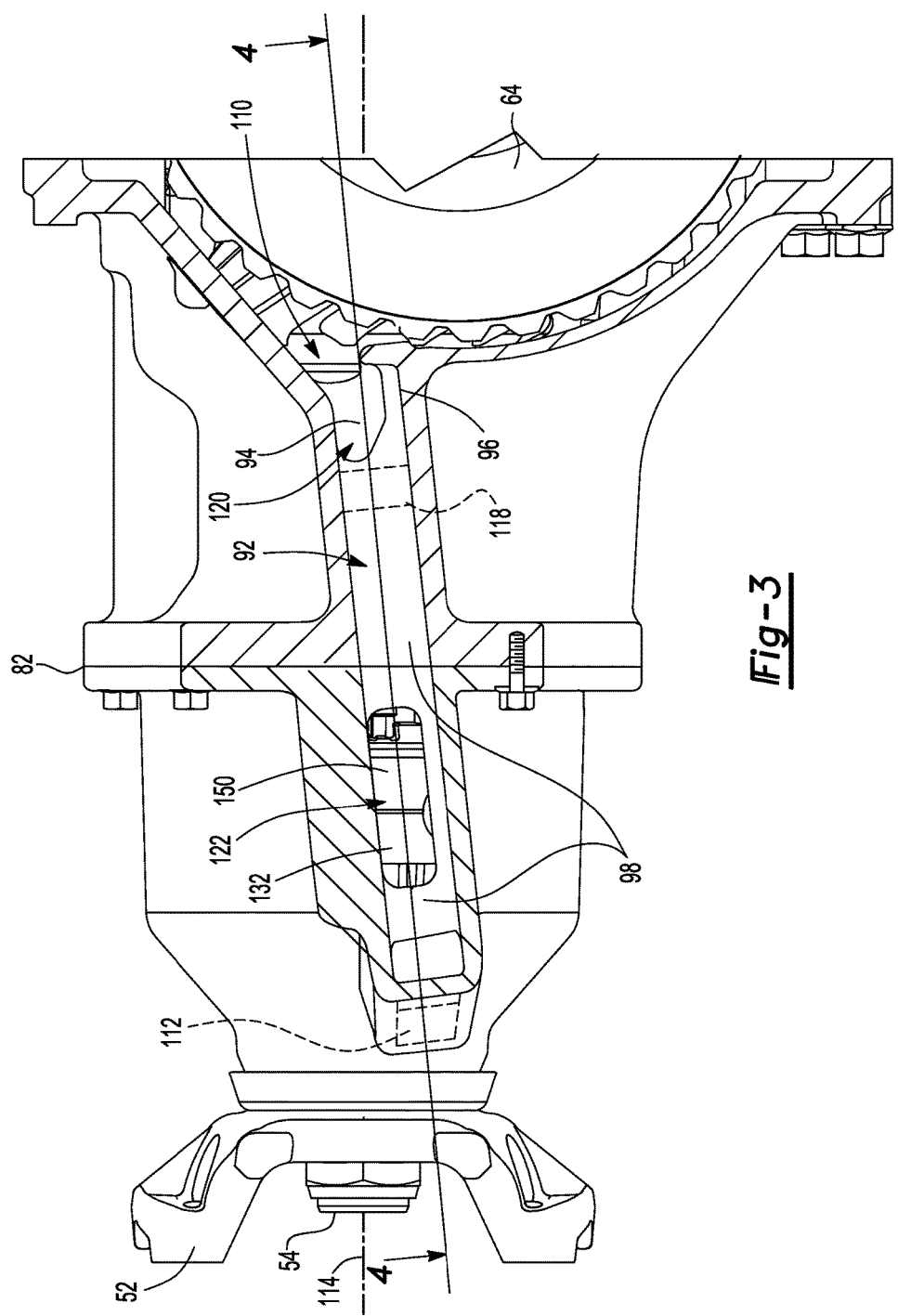
FIG. 3 is a section view of the axle assembly along section line 3-3.
Figure 4:
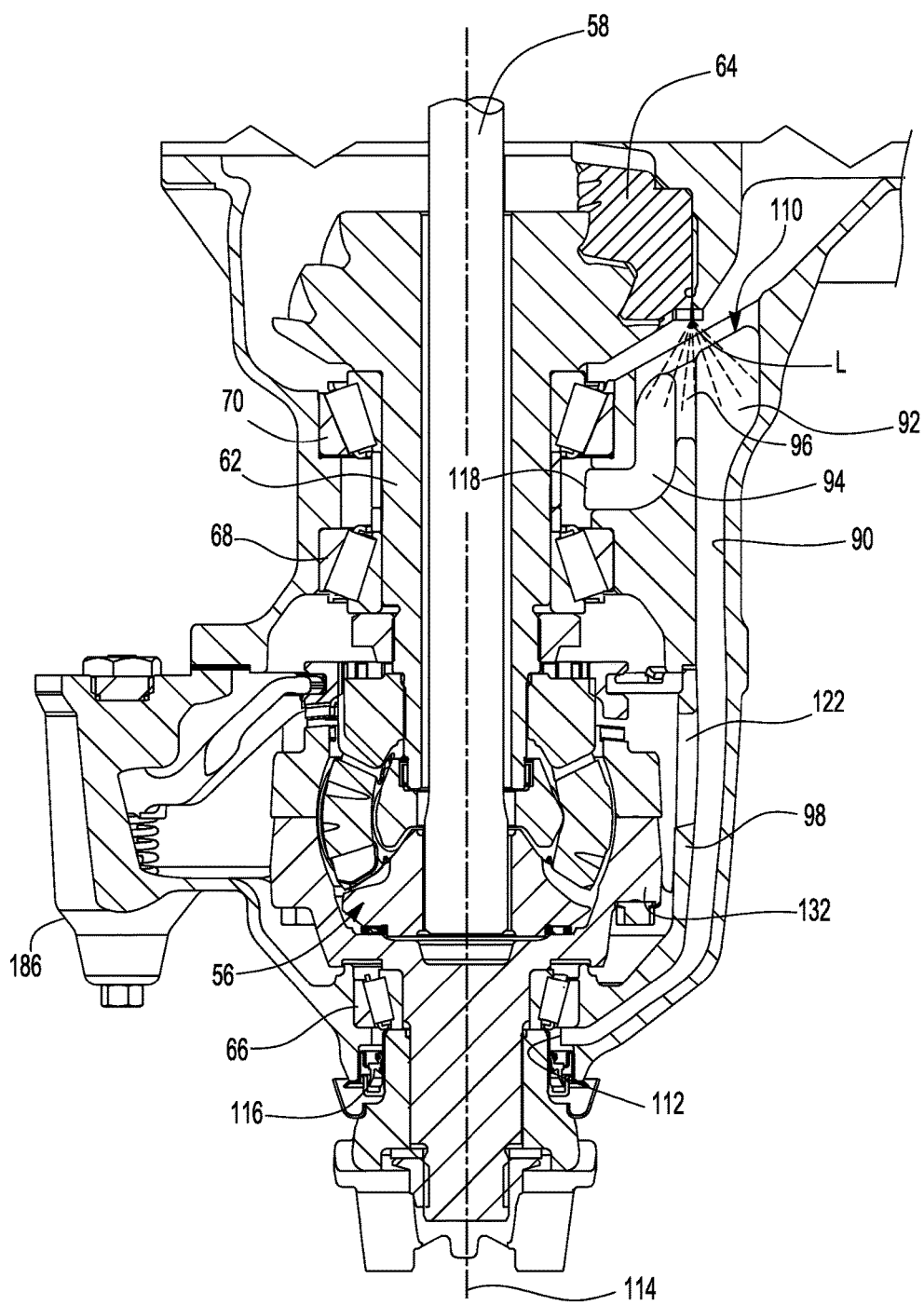
FIG. 4 is a section view of the axle assembly along section line 4-4.
Figure 7:
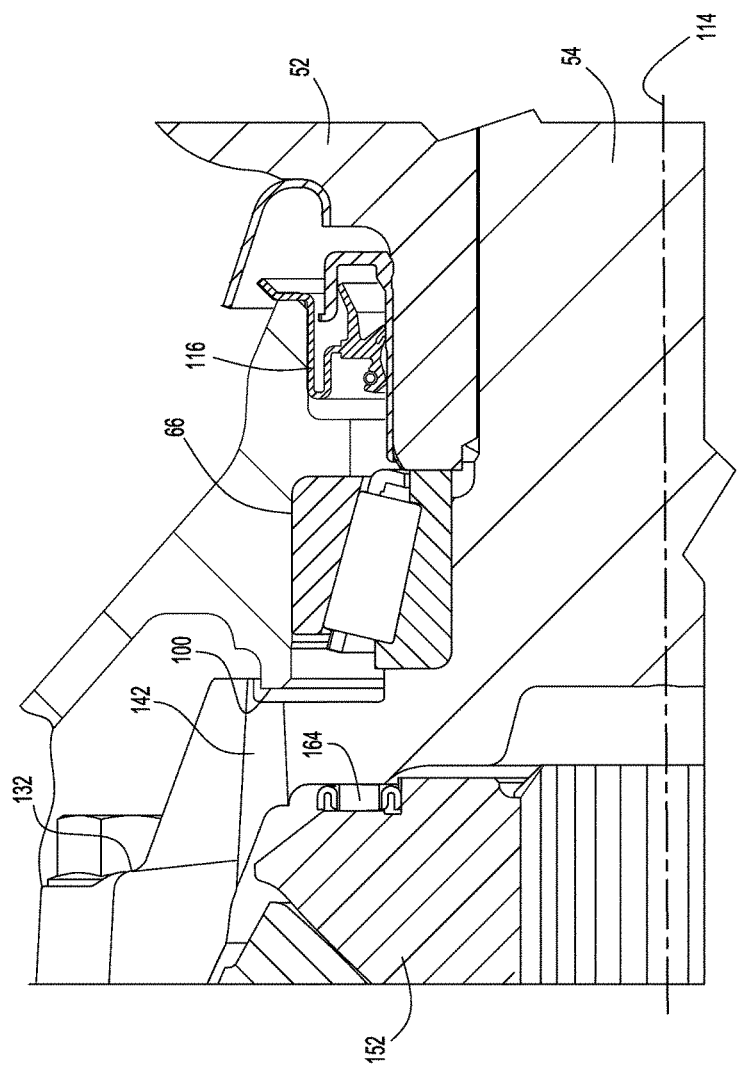
FIG. 7 is a magnified view of a portion of FIG. 6.

Referring to FIGS. 2-4, the differential carrier 82 may be mounted on the axle housing 80. For example, the differential carrier 82 may be mounted on the center portion with a plurality of fasteners, such as bolts. The differential carrier 82 may support the differential 72. For instance, the differential 72 may be mounted on the differential carrier 82 such that the differential carrier 82 and differential 72 may be installed or removed as a unit, or installed together onto the axle housing 80 or removed together from the axle housing 80. In at least one embodiment, the differential carrier 82 may include an interior surface 90, a first lubricant passage 92, a second lubricant passage 94, a separating wall 96, a divider wall 98 and a support wall 100, which is best shown in FIG. 7.

Referring to FIG. 4, the interior surface 90 may be disposed opposite an exterior surface of the differential carrier 82. As such, the interior surface 90 may at least partially define an outer wall of the differential carrier 82 that forms the exterior of the differential carrier 82.

Referring to FIGS. 3 and 4, the first lubricant passage 92 may provide lubricant to the interaxle differential unit 56 and the first roller bearing assembly 66. The first lubricant passage 92 may extend along the interior surface 90 and may be at least partially defined by the interior surface 90. As is best shown in FIG. 4, the first lubricant passage 92 may be disposed between the interior surface 90 and the interaxle differential unit 56 and may be disposed between the interior surface 90 and the second lubricant passage 94. The first lubricant passage 92 may extend from an inlet 110 to a first lubricant passage outlet 112. As is best shown in FIG. 3, the first lubricant passage 92 may be sloped downward such that the first lubricant passage 92 may be disposed closer to an axis 114 at the first lubricant passage outlet 112 than at the inlet 110. Moreover, the first lubricant passage outlet 112 may be disposed closer to the axis 114 than the inlet 110 in a radial direction as is best shown in FIG. 4.

The inlet 110 may provide lubricant to the first lubricant passage 92 and the second lubricant passage 94. As is best shown in FIG. 4, the inlet 110 may be disposed proximate the ring gear 64 and may receive a lubricant L, such as oil. Lubricant may be splashed by one or more rotating components of the first axle assembly 32, such as the ring gear 64. Lubricant may be directly splashed by a rotating component into the inlet 110 or may be splashed by a rotating component onto the housing assembly 50 and may then drip down one or more interior surfaces of the housing assembly 50 into the inlet 110.

Figure 6:
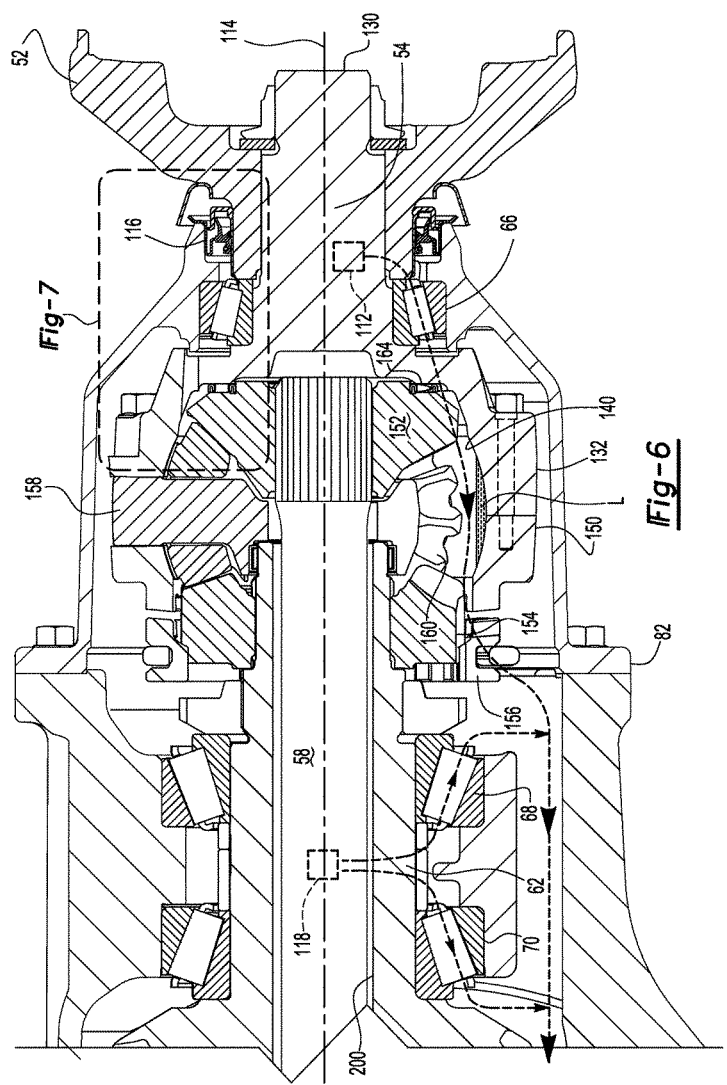
FIG. 6 is a magnified view of a portion of FIG. 5.

The first lubricant passage outlet 112 may be disposed at an opposite end of the first lubricant passage 92 from the inlet 110. The first lubricant passage outlet 112 may be disposed proximate the first roller bearing assembly 66. For example, the first lubricant passage outlet 112 may be disposed between an end of the input shaft 54 and the first roller bearing assembly 66 or between a seal 116 and the first roller bearing assembly 66. The seal 116 may extend around the axis 114 and may extend between the housing assembly 50 and the input shaft 54 or the input yoke 52 as is best shown in FIG. 6.

Referring to FIGS. 3 and 4, the second lubricant passage 94 may provide lubricant to the second roller bearing assembly 68 and the third roller bearing assembly 70. The second lubricant passage 94 may be disposed between the first lubricant passage 92 and the pinion 62. The second lubricant passage 94 may extend from the inlet 110 to a second lubricant passage outlet 118.

The inlet 110 may provide lubricant to the second lubricant passage 94 as previously described.

The second lubricant passage outlet 118 may be disposed at an opposite end of the second lubricant passage 94 from the inlet 110. The second lubricant passage outlet 118 may be disposed proximate the second roller bearing assembly 68 and the third roller bearing assembly 70. For example, the second lubricant passage outlet 118 may be disposed between the second roller bearing assembly 68 and the third roller bearing assembly 70 as is best shown in FIG. 4. As is best shown in FIG. 3, the second lubricant passage outlet 118 may be at least partially disposed above the axis 114 and may be disposed above the first lubricant passage outlet 112. As such, the second lubricant passage outlet 118 may be disposed closer from the axis 114 in an axial direction than the first lubricant passage outlet 112 from the perspective shown in FIG. 3.

Referring to FIGS. 3 and 4, the separating wall 96 may be disposed between the first lubricant passage 92 and the second lubricant passage 94. The separating wall 96 may extend from the bottom of the first lubricant passage 92 and the second lubricant passage 94 and may partially separate the first lubricant passage 92 from the second lubricant passage 94 to inhibit or reduce lubricant flow between the first lubricant passage 92 and the second lubricant passage 94. The separating wall 96 may at least partially define a window 120. The window 120 may be disposed above the separating wall 96 and may extend from the first lubricant passage 92 to the second lubricant passage 94. The window 120 may be disposed proximate the inlet 110 and may increase the effective size of the inlet 110 as compared to a configuration that does not have a window, which may help increase the amount of lubricant that may be received through the inlet 110.

The divider wall 98 may be disposed between the first lubricant passage 92 and the input shaft 54 and between the first lubricant passage 92 and the interaxle differential unit 56. The divider wall 98 may extend from the separating wall 96 toward the first lubricant passage outlet 112 and may have an overflow window 122. The overflow window 122 may permit lubricant to exit the first lubricant passage 92 in the event that the first lubricant passage outlet 112 is blocked or when too much lubricant is being supplied to the first lubricant passage outlet 112. The overflow window 122 may be disposed below the axis 114 and may be disposed adjacent to a flange portion of the input shaft 54 and a case gear of the interaxle differential unit 56 as will be discussed in more detail below.

Referring to FIG. 7, the support wall 100 may support the first roller bearing assembly 66. The support wall 100 may extend toward or into a flange lubricant hole the input shaft 54 as will be discussed in more detail below.

Referring to FIG. 5, the input yoke 52 may facilitate coupling of the first axle assembly 32 to the drive shaft 36. The input yoke 52 may be coupled to the drive shaft 36 in any suitable manner, such as with a universal joint. The input yoke 52 may also be fixedly coupled to the input shaft 54. For instance, the input yoke 52 may include a center bore that may receive an end of the input shaft 54. The center bore and the input shaft 54 may be provided with mating splines that may help align and secure the input yoke 52 to the input shaft 54 such that the input yoke 52 may not rotate with respect to the input shaft 54. A fastener, such as a nut, may be threaded onto an end of the input shaft 54 to further secure and inhibit removal of the input yoke 52 from the input shaft 54.

The input shaft 54 may be at least partially disposed in the housing assembly 50. The input shaft 54 may extend along and may be configured to rotate about the axis 114. For instance, the input shaft 54 may be supported by the first roller bearing assembly 66, which may be disposed on the housing assembly 50. The first roller bearing assembly 66 may facilitate rotation of the input shaft 54 and may help inhibit axial movement of the input shaft 54 along the axis 114. The input shaft 54 may include a first end 130 and a flange portion 132.

Figure 8:
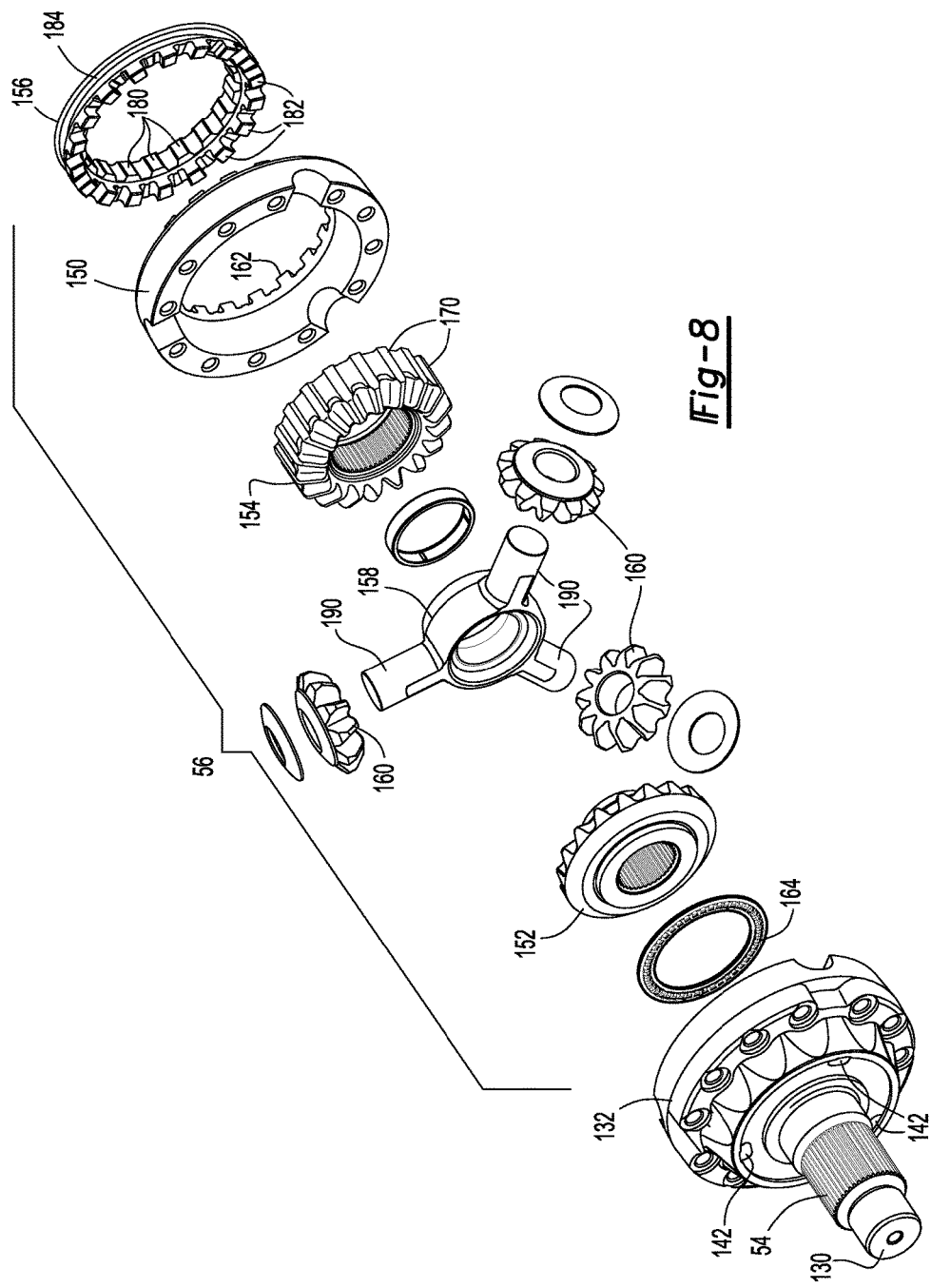
FIG. 8 is an exploded view of an interaxle differential unit that may be provided with the axle assembly.

Referring to FIGS. 5 and 8, the first end 130 may be disposed at an end of the input shaft 54. The first end 130 may be disposed proximate the input yoke 52 and may be disposed outside of the housing assembly 50.

The flange portion 132 may be disposed opposite the first end 130. The flange portion 132 may be disposed inside the housing assembly 50 and may extend away from the axis 114. The flange portion 132 may include an interior flange surface 140 and at least one flange lubricant hole 142. As is best shown in FIG. 3, the flange portion 132 may be disposed adjacent to the overflow window 122.

Referring to FIGS. 5 and 6, the interior flange surface 140 may extend around the axis 114. As such, the interior flange surface 140 may face toward the interaxle differential unit 56 and may be disposed between the interaxle differential unit 56 and the divider wall 98.

Referring to FIGS. 6 and 8, at least one flange lubricant hole 142 may extend through the flange portion 132. In the embodiment shown in FIG. 8, three flange lubricant holes 142 are provided; however, it is contemplated that a greater or lesser number of flange lubricant holes 142 may be provided in one or more embodiments. As is best shown in FIG. 6, one or more flange lubricant holes 142 may be disposed further from the axis 114 then at least a portion of the first roller bearing assembly 66. In addition, the flange lubricant holes 142 may be radially disposed about the axis 114 and may be located between the axis 114 and the interior flange surface 140. The flange lubricant holes 142 may provide lubricant to the interaxle differential unit 56. More specifically, lubricant that is provided to the first roller bearing assembly 66 via the first lubricant passage outlet 112 may pass through the first roller bearing assembly 66 and then pass through a flange lubricant hole 142 to reach and lubricate the interaxle differential unit 56. The flow of lubricant is represented by the dashed arrowed lines in FIG. 6. In FIG. 6, the dashed arrowed line near the first roller bearing assembly 66 may extend through a flange lubricate hole 142 that is not in the section plane of FIG. 6.

Referring to FIGS. 6 and 8, the interaxle differential unit 56 may be disposed in the housing assembly 50 on the input shaft 54. The interaxle differential unit 56 may be configured to compensate for speed differences between the first axle assembly 32 and the second axle assembly 34, which may be manifested as rotational speed differences between the input shaft 54 and the output shaft 58. In at least one embodiment, the interaxle differential unit 56 may include a case gear 150, a first gear 152, a second gear 154, a lock collar 156, a spider 158, and a plurality of pinion gears 160.

The case gear 150 may be configured as a ring that may extend around the axis 114. The case gear 150 may be fixedly disposed on the flange portion 132 of the input shaft 54. For example, the flange portion 132 may be attached to the case gear 150 with a plurality of fasteners, such as bolts. The case gear 150 and the flange portion 132 may cooperate to define a plurality of spider pin holes that may receive pins of the spider 158. In addition, the case gear 150 and the flange portion 132 may cooperate to define a cavity that may receive various components of the interaxle differential unit 56. The case gear 150 may be spaced apart from and may not engage the housing assembly 50, the output shaft 58, and the pinion 62 to facilitate rotation with respect to these components. The case gear 150 may include a case gear portion 162 that may include a set of teeth that may be arranged on a side or face of the case gear 150 that faces toward the lock collar 156. The case gear portion 162 may selectively engage corresponding teeth on the lock collar 156 as will be discussed in more detail below.

The first gear 152 may be disposed between the input shaft 54 and the spider 158. The first gear 152 may be disposed proximate an exterior surface of the output shaft 58. For example, the first gear 152 may extend along the axis 114 and may have a center bore that may receive an end of the output shaft 58. The center bore may have a spline that may engage and mesh with a corresponding spline on the output shaft 58 to inhibit rotation of the first gear 152 with respect to the output shaft 58. The first gear 152 may also include a set of teeth that may mate with the pinion gears 160. A thrust bearing 164 may be disposed between and may engage the input shaft 54 and the first gear 152. The thrust bearing 164 may extend around the axis 114 and may rotatably support the first gear 152. As is best shown in FIG. 6, the thrust bearing 164 may be disposed closer to the axis 114 than the flange lubricant holes 142. As such, the flange lubricant holes 142 may be disposed between the thrust bearing 164 and the interior flange surface 140.

The second gear 154 may be disposed opposite the first gear 152 and may be disposed between the pinion 62 and the spider 158. The second gear 154 may be disposed proximate an exterior surface of the pinion 62. For example, the second gear 154 may extend along the axis 114 and may have a center bore that may receive an end of the pinion 62. The center bore may have a spline that may engage and mate with a corresponding spline on the pinion 62 to inhibit rotation of the second gear 154 with respect to the pinion 62. The second gear 154 may also include a set of teeth that may mesh with the pinion gears 160 and a set of radial teeth 170 that may mesh with teeth on the lock collar 156. The radial teeth 170 may extend outwardly from an outside circumference of the second gear 154. The second gear 154 may be spaced apart from the case gear 150 and lubricant may exit the interaxle differential unit 56 between the second gear 154 and the case gear 150 as shown near the bottom of FIG. 6. Lubricant exiting the interaxle differential unit 56 may then flow through the differential carrier 82 and into a sump portion or bottom portion of the axle housing 80 where it may again be splashed by a rotating ring gear 64.

The lock collar 156 may be moveably disposed on the second gear 154. The lock collar 156 may be configured as ring that may extend around the axis 114 and may include a first gear portion 180, a second gear portion 182, and an annular groove 184.

The first gear portion 180 may include a plurality of teeth that may be arranged on an inside surface or inside diameter of the lock collar 156 for mating with the set of radial teeth 170.

The second gear portion 182 may include a set of teeth that may be arranged on a side or face of the lock collar 156 that faces toward the case gear 150. The second gear portion 182 may engage the teeth on the case gear portion 162 when the lock collar 156 is in a locked position and may be spaced apart from the teeth on the lock collar 156 when the lock collar is in an unlocked position. In the locked position, the input shaft 54 and the output shaft 58 may rotate together about the axis 114. In the unlocked position, the input shaft 54 and the output shaft 58 may not rotate together about the axis 114. As such, the input shaft 54 and the output shaft 58 may rotate at different rotational velocities.

The annular groove 184 may be spaced apart from the first gear portion 180 and the second gear portion 182. The annular groove 184 may extend continuously around the lock collar 156 and may receive a linkage, such as a fork, which in turn may be connected to or actuated by an actuator 186, which is best shown in FIG. 4. The actuator 186 may be of any suitable type, such as a pneumatic, hydraulic, vacuum, mechanical, electrical, or electromechanical actuator.

The spider 158 may be disposed between the flange portion 132 of the input shaft 54 and the case gear 150 and may be fixedly positioned with respect to the input shaft 54 in the case gear 150. For instance, the spider 158 may include a center bore and a set of pins 190. The center bore may extend around the axis 114. The output shaft 58 may be spaced apart from and may extend through the center bore to reach the first gear 152. The set of pins 190 may extend away from the center bore. Each pin 190 may be received in a corresponding spider pin hole that may be defined by the input shaft 54 and the case gear 150. In the embodiment shown in FIG. 8, three pins 190 are shown; however, it is contemplated that a greater or lesser number of pins 190 may be provided in one or more embodiments. Ends of the pins 190 may be spaced apart from the housing assembly 50 so as not to interfere with rotation of the interaxle differential unit 56.

A pinion gear 160 may be rotatably disposed on each pin 190. Each pinion gear 160 may be generally disposed in the cavity defined by the flange portion 132 and the case gear 150 and may be retained on a corresponding pin 190 with a fastener, such as a thrust washer that may be coupled to or may engage the interior flange surface 140 of the flange portion 132 and/or the case gear 150. Each pinion gear 160 may include a set of teeth that may mate with the first gear 152 and the second gear 154.

Referring to FIGS. 5 and 6, the output shaft 58 may be at least partially disposed in the housing assembly 50. The output shaft 58 may be configured to provide torque to the second axle assembly 34. The output shaft 58 may extend along and may be configured to rotate about the axis 114 and may extend through the pinion 62. The output shaft 58 may have a first end and a second end. The first end may be received in the first gear 152. The second end may be disposed opposite the first end and may be coupled to the output yoke 60.

The output yoke 60 may facilitate coupling of the first axle assembly 32 to the prop shaft 38. The output yoke 60 may be coupled to the prop shaft 38 in any suitable manner, such as with a universal joint. The output yoke 60 may be fixedly positioned on or with respect to the output shaft 58. For instance, the output yoke 60 may include a center bore that may receive an end of the output shaft 58. The center bore and the output shaft 58 may be provided with mating splines that may help align and inhibit rotation of the output yoke 60 with respect to the output shaft 58. A fastener, such as a nut, may be threaded onto an end of the output shaft 58 to further secure and inhibit removal of the output yoke 60 from the output shaft 58.

The pinion 62 may be spaced apart from the input shaft 54 and may be configured to rotate about the axis 114. The pinion 62 may be supported by one or more bearings that may be disposed on the housing assembly 50, such as the second roller bearing assembly 68 and the third roller bearing assembly 70. The second roller bearing assembly 68 and the third roller bearing assembly 70 may facilitate rotation of the pinion 62 while inhibiting axial movement of the pinion 62 along the axis 114. The pinion 62 may include a pinion hole 200 and a pinion gear portion 202.

The pinion hole 200 may be a through hole that may be disposed along the axis 114. The output shaft 58 may extend through the pinion hole 200.

The pinion gear portion 202 may be disposed at an end of the pinion 62. The pinion gear portion 202 may be integrally formed with the pinion 62 and may include a set of teeth that mate with corresponding teeth of the ring gear 64. As is best shown in FIG. 4, the pinion gear portion 202 may be disposed proximate the inlet 110.

The ring gear 64 may be configured to rotate about a second axis 210 and may be operatively connected to the differential 72. The second axis 210 may be disposed substantially perpendicular to the axis 114.

The first roller bearing assembly 66 may be disposed proximate the housing assembly 50 and may rotatably support the input shaft 54. In addition, the first roller bearing assembly 66 may be axially positioned between the flange portion 132 and the input yoke 52. The first roller bearing assembly 66 may include a plurality of rolling elements, such as balls or rollers, that may be disposed between an inner race and an outer race. In at least one embodiment, the first roller bearing assembly 66 may be configured as a tapered roller bearing and may pump lubricant through itself and into the interaxle differential unit 56 when rotated. For example, the first roller bearing assembly 66 may be disposed on the support wall 100 of the housing assembly 50 and may extend between the support wall 100 and the input shaft 54. As is best shown in FIG. 7, the support wall 100 may extend toward the flange portion 132 of the input shaft 54 or into the flange lubricant hole 142 the input shaft 54. As such, the support wall 100 may overhang part of the flange portion 132 and may help direct lubricant into the flange lubricant hole 142 and may help inhibit lubricant from passing between the running clearance between the support wall 100 and the flange portion 132, which would allow lubricant to bypass the interaxle differential unit 56 and flow around the outside of the interaxle differential unit 56. Thus, a "dry sump" may be provided between the inside of the differential carrier 82 and the exterior of the interaxle differential unit 56. Optionally, a seal may be provided between the outside of the support wall 100 and the inside or overhanging inner lip of the flange portion 132 to inhibit lubricant from bypassing the interaxle differential unit 56.

The second roller bearing assembly 68 and the third roller bearing assembly 70 may be disposed proximate the housing assembly 50 and may rotatably support the pinion 62. The second roller bearing assembly 68 and the third roller bearing assembly 70 may each include a plurality of rolling elements, an inner race, and an outer race as previously described. The second roller bearing assembly 68 may be spaced apart from and may not engage the third roller bearing assembly 70. The second roller bearing assembly 68 may be axially positioned between the interaxle differential unit 56 and the third roller bearing assembly 70.

The differential 72 may be disposed in the axle housing 80 of the housing assembly 50. The differential 72 may be configured to transmit torque to its associated traction wheel assemblies 20 via the wheel axles 40 and permit the traction wheel assemblies 20 associated with the axle assembly to rotate at different velocities.

An axle assembly having lubricant passages as described above may provide lubricant to components such as bearings and an interaxle differential unit without an electrical or electromechanical oil pump, which may reduce complexity and associated costs. In addition, the lubricant passages may provide lubricant into an interaxle differential unit via a roller bearing assembly, which may help pump lubricant into the interaxle differential unit as the roller bearing assembly rotates. Moreover, providing lubricant into the interaxle differential unit through one or more flange lubricant holes may allow the region outside the case or outside the case gear and flange portion of the input shaft to be kept free or relatively free of lubricant, which may allow the interaxle differential to rotate without incurring churning losses or drag that may occur if the interaxle differential unit rotated through an external volume of lubricant, thereby improving operating efficiency of the axle assembly. Furthermore, providing lubricant into the interaxle differential unit may help prevent damage to interaxle differential components when a spinout condition occurs, or when the input shaft and the output shaft rotate at highly dissimilar speeds since lubricant will tend to accumulate inside the interaxle differential unit near where the spider pins extend through the case even when the input shaft and interaxle differential unit are rotating.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a housing assembly having an interior surface, a first lubricant passage, and a second lubricant passage;
   an input shaft that is rotatable about an axis and includes a first end and a flange portion disposed opposite the first end, the flange portion having a flange lubricant hole;
   a first roller bearing assembly that is disposed proximate the housing assembly and rotatably supports the input shaft;
   an output shaft that is at least partially disposed in the housing assembly and is configured to provide torque to a second axle assembly;
   a pinion that is rotatable about the axis and that has a pinion hole that receives the output shaft;
   second and third roller bearing assemblies that rotatably support the pinion, wherein the second lubricant passage has a second lubricant passage outlet that is disposed between the second roller bearing assembly and the third roller bearing assembly; and
   an interaxle differential unit that is disposed in the housing assembly and is operatively coupled to the input shaft and the output shaft and compensates for rotational speed differences between the input shaft and the output shaft;
   wherein the first lubricant passage is disposed between the interior surface and the interaxle differential unit and has a first lubricant passage outlet that is disposed between the first end of the input shaft and the first roller bearing assembly, wherein lubricant that exits the first lubricant passage outlet flows through the first roller bearing assembly and then passes through the flange lubricant hole to lubricate the interaxle differential unit.

2. The axle assembly of claim 1 wherein the first lubricant passage has an inlet disposed opposite the first lubricant passage outlet, wherein the first lubricant passage is sloped such that the first lubricant passage is closer to the axis at the first lubricant passage outlet than at the inlet.

3. The axle assembly of claim 1 wherein the flange lubricant hole is disposed further from the axis than at least a portion of the first roller bearing assembly.

4. The axle assembly of claim 1 wherein the flange portion has an interior flange surface that extends around the axis, wherein the flange lubricant hole is disposed between the axis and the interior flange surface.

5. An axle assembly comprising:
   a housing assembly having an interior surface and a first lubricant passage;
   an input shaft that is rotatable about an axis and includes a first end and a flange portion disposed opposite the first end, the flange portion having a flange lubricant hole and an interior flange surface that extends around the axis, wherein the flange lubricant hole is disposed between the axis and the interior flange surface;
   a first roller bearing assembly that is disposed proximate the housing assembly and rotatably supports the input shaft;
   an output shaft that is at least partially disposed in the housing assembly and is configured to provide torque to a second axle assembly; and an interaxle differential unit that is disposed in the housing assembly and is operatively coupled to the input shaft and the output shaft and compensates for rotational speed differences between the input shaft and the output shaft, wherein the interaxle differential unit includes a thrust bearing that extends around the axis and is disposed adjacent to the flange portion such that the flange portion is disposed between the first roller bearing assembly and the thrust bearing, wherein the flange lubricant hole is disposed between the thrust bearing and the interior flange surface; and wherein the first lubricant passage is disposed between the interior surface and the interaxle differential unit and has a first lubricant passage outlet that is disposed between the first end of the input shaft and the first roller bearing assembly, wherein lubricant that exits the first lubricant passage outlet flows through the first roller bearing assembly and then passes through the flange lubricant hole to lubricate the interaxle differential unit.

6. The axle assembly of claim 1 wherein the interaxle differential unit includes a case gear that is fixedly disposed on the flange portion, wherein the output shaft extends through the case gear and into the flange portion.

7. The axle assembly of claim 6 wherein a divider wall is disposed between the first lubricant passage and the flange portion and between the first lubricant passage and the interaxle differential unit.

8. An axle assembly comprising:
a housing assembly having an interior surface, a divider wall, and a first lubricant passage;
an input shaft that is rotatable about an axis and includes a first end and a flange portion disposed opposite the first end, the flange portion having a flange lubricant hole;
a first roller bearing assembly that is disposed proximate the housing assembly and rotatably supports the input shaft;
an output shaft that is at least partially disposed in the housing assembly and is configured to provide torque to a second axle assembly; and
an interaxle differential unit that is disposed in the housing assembly and is operatively coupled to the input shaft and the output shaft and compensates for rotational speed differences between the input shaft and the output shaft, wherein the interaxle differential unit includes a case gear that is fixedly disposed on the flange portion and the output shaft extends through the case gear and into the flange portion; and
wherein the divider wall is disposed between the first lubricant passage and the flange portion and between the first lubricant passage and the interaxle differential unit, the divider wall has an overflow window that is disposed adjacent to the flange portion and the case gear, the first lubricant passage is disposed between the interior surface and the interaxle differential unit and has a first lubricant passage outlet that is disposed between the first end of the input shaft and the first roller bearing assembly, and lubricant that exits the first lubricant passage outlet flows through the first roller bearing assembly and then passes through the flange lubricant hole to lubricate the interaxle differential unit.

9. The axle assembly of claim 8 wherein the housing assembly has a support wall that supports the first roller bearing assembly, wherein the support wall is disposed proximate the flange lubricant hole and overhangs a portion of the flange portion.

10. An axle assembly comprising:
a housing assembly having an interior surface, a first lubricant passage, a second lubricant passage, and an inlet that provides lubricant to the first and second lubricant passages;
an input shaft that is rotatable about an axis and that has a flange portion that has a flange lubricant hole;
an output shaft that is rotatable about the axis and is configured to provide torque to a second axle assembly;
a pinion that is rotatable about the axis and that has a pinion hole that receives the output shaft;
an interaxle differential unit that is operatively coupled to the input shaft, the output shaft, and the pinion, wherein the interaxle differential unit compensates for rotational speed differences between the input shaft and the output shaft;
a first roller bearing assembly that rotatably supports the input shaft; and
a second roller bearing assembly that rotatably supports the pinion;
wherein the first lubricant passage is disposed between the interior surface and the second lubricant passage and has a first lubricant passage outlet that is disposed proximate the first roller bearing assembly, wherein lubricant that exits the first lubricant passage outlet flows through the first roller bearing assembly and then passes through the flange lubricant hole to lubricate the interaxle differential unit; and
wherein the second lubricant passage is disposed between the first lubricant passage and the pinion and provides lubricant to the second roller bearing assembly.

11. The axle assembly of claim 10 further comprising a third roller bearing assembly that rotatably supports the pinion, wherein the second lubricant passage has a second lubricant passage outlet that is disposed between the second roller bearing assembly and the third roller bearing assembly.

12. The axle assembly of claim 11 wherein the second lubricant passage outlet is at least partially disposed above the axis and is disposed above the first lubricant passage outlet.

13. The axle assembly of claim 11 wherein the first lubricant passage outlet is disposed closer to the axis than the second lubricant passage outlet.

14. The axle assembly of claim 10 wherein the pinion has a pinion gear portion and the inlet is disposed above the axis proximate the pinion gear portion.

15. The axle assembly of claim 10 wherein the axle assembly further comprises a ring gear that is driven by the pinion, wherein the inlet receives lubricant that is splashed when the ring gear rotates.

16. The axle assembly of claim 10 wherein the housing assembly further comprises a separating wall that is disposed between the first lubricant passage and the second lubricant passage and a window that is disposed above the separating wall and that extends from the first lubricant passage to the second lubricant passage.

17. The axle assembly of claim 10 further comprising an input yoke disposed on the input shaft and a seal that extends around the axis and that extends between the input yoke and the housing assembly, wherein the first lubricant passage outlet is disposed between the seal and the first roller bearing assembly.

18. The axle assembly of claim 10 wherein the interaxle differential unit includes:
a case gear that is fixedly positioned with respect to the flange portion;

a spider that is disposed between the flange portion and the case gear;

a pinion gear that is rotatably disposed on the spider;

a first gear that engages the pinion gear and is disposed on the output shaft such that the first gear does not rotate about the axis with respect to the output shaft; and a second gear that engages the pinion gear and is disposed on the pinion such that the second gear does not rotate about the axis with respect to the pinion.

19. The axle assembly of claim 18 wherein the output shaft extends through the spider and the second gear and is received in the first gear.

20. The axle assembly of claim 18 wherein the first roller bearing assembly pumps lubricant toward the flange lubricant hole and lubricant exits the interaxle differential unit between the case gear and the second gear.

* * * * *